(12) United States Patent
Bastian

(10) Patent No.: US 7,012,184 B2
(45) Date of Patent: Mar. 14, 2006

(54) DISC FOR USE IN AN APPARATUS FOR SIGNAL PROCESSING AND SUCH AN APPARATUS

(75) Inventor: Mark-Jan Bastian, Amstelveen (NL)

(73) Assignee: N2IT Holding B.V., Amsterdam (NL)

( * ) Notice: Subject to any disclaimer, the term of this patent is extended or adjusted under 35 U.S.C. 154(b) by 346 days.

(21) Appl. No.: 10/133,846

(22) Filed: Apr. 26, 2002

(65) Prior Publication Data
US 2002/0181378 A1 Dec. 5, 2002

Related U.S. Application Data

(63) Continuation of application No. PCT/NL01/00055, filed on Jan. 26, 2001.

(30) Foreign Application Priority Data

Feb. 29, 2000 (NL) .................................. 1014526

(51) Int. Cl.
*G10H 7/00* (2006.01)
(52) U.S. Cl. ............................. 84/612; 369/9
(58) Field of Classification Search ................ 84/612, 84/645; 369/9, 69, 70
See application file for complete search history.

(56) References Cited

U.S. PATENT DOCUMENTS

| | | | | |
|---|---|---|---|---|
| 3,755,792 A | * | 8/1973 | Harvey | ........................ 365/244 |
| 4,300,225 A | * | 11/1981 | Lambl | ............................ 369/2 |
| 4,901,300 A | * | 2/1990 | Van Der Zande et al. | . 369/47.4 |
| 5,339,301 A | * | 8/1994 | Raaymakers et al. | .... 369/47.12 |
| 5,512,704 A | | 4/1996 | Adachi | |
| 5,862,106 A | * | 1/1999 | Washikawa et al. | ...... 369/30.13 |
| 6,541,690 B1 | * | 4/2003 | Segers, Jr. | ..................... 84/605 |
| 6,576,825 B1 | * | 6/2003 | Yamada et al. | ............... 84/602 |
| 6,818,815 B1 | * | 11/2004 | Cohen | .......................... 84/645 |
| 2003/0029305 A1 | * | 2/2003 | Kent et al. | ..................... 84/645 |
| 2005/0152236 A1 | * | 7/2005 | Wardle | ..................... 369/39.01 |

FOREIGN PATENT DOCUMENTS

EP 0871173 A2 10/1998
WO WO97/01168 A1 9/1997

OTHER PUBLICATIONS

What is Final Scratch? http://www.finalscratch.com/fs4/load.asp?db=FS_MAC&sub=start.*
Hacker, et al.., "The BeOS Bible," published by Peachpit Press, copyright 1999, p. 751.

* cited by examiner

*Primary Examiner*—Jeffrey W Donels
(74) *Attorney, Agent, or Firm*—Jeffrey D. Myers; Peacock Myers P.C.; Janeen Vilven

(57) ABSTRACT

The invention relates to a disc for use in an apparatus for signal processing, which apparatus comprises a digital audio source and a record player with a turntable and an arm carrying a pick-up element which is arranged to play a conventional record. The disc during its use is placed on the turntable and is provided with a groove which can be lowered by the pick-up element, and which comprises a time-code signal wherein during use of the disc the said time-code signal controls the digital audio source.

5 Claims, 3 Drawing Sheets

DISC FOR USE IN AN APPARATUS FOR SIGNAL PROCESSING AND SUCH AN APPARATUS

This application is a continuation of PCT/NL01/00055 filed Jan. 26, 2001.

FIELD OF THE INVENTION

The invention primarily relates to a disc for use in an apparatus for signal processing. Further, the invention relates to such an apparatus for signal processing.

BACKGROUND OF THE INVENTION

From WO 97/01168, a system is known for the digital processing of audio signals which is particularly suitable for disc jockeys and scratch artists. The speed and direction of a digital audio signal, for instance derived from a CD player, can be controlled according to this citation by the manual control of a rotational element. This rotational element is placed for instance on a turntable of a conventional record player and is being read by means of an optical sensor determining the speed and direction of rotation of the turntable. The data that are obtained thereby are being used to control the speed and direction of reproduction of the CD player. The problem associated with this known apparatus is, however, that is hardly usable by disc jockeys and in scratch applications for the reason that from a given position of the reading head of the CD player only continuously developing relative movements are possible that depend on the control of the earlier mentioned rotational element. In the known apparatus, it is for instance not possible to make swift reproductions of different musical segments on the CD in a way that is reproducible and can be controlled satisfactorily. Also the authentic scratch sound which can be realised by means of a conventional record, cannot be obtained with the known apparatus.

SUMMARY OF THE INVENTION

With the invention it is intended to improve this and to provide a system which allows to provide a sound impression with a digital sound source which conforms to the possibilities that exist with conventional records, and with which quickly digitally recorded (musical) fragments can be located.

In a first aspect of the invention, a disc is proposed therefore which is designed for use in such an apparatus for signal processing, such that the disc during its use is placed on the turntable and is provided with a groove which can be followed by the pick-up element, and which comprises a time-code signal wherein during use of the disc the said time-code signal controls the digital audio source.

A practical embodiment of the disc is characterized in that the time-code signal is an absolute time-code signal that is comprised in the groove in a predetermined number subsequently arranged discrete steps. It is advisable to select the number of discrete steps in such way that the resolution is sufficiently high to realise the intended effect. In practice this means that the number of discrete steps may count five per second.

From a view point of cost efficiency and also to make a natural connection to the known scratching techniques with conventional records, it is desirable that the time-code signal is modulated on a carrier frequency in the audible range between 20 and 20,000 Hz. In this way, it is possible to simply use normal audio equipment for playing the disc.

In a further aspect of the invention, the apparatus for signal processing is so equipped that the pick-up element feeds a digital filter which has a phase-locked loop circuit for detecting and following a carrier frequency, and a demodulation circuit for demodulating the time-code signal that is modulated on the carrier frequency. The disc and the apparatus for signal processing can then cooperate such that the absolute time-code signal that is present on the disc, provides the control for the digital audio source.

It is further advantageous that the groove of the disc comprises a time-code signal in both the left and the right channel, which are mutually shifted in phase. In this way, a quick determination of the direction in respect of the rotation of the disc can be extracted.

Appropriately then the apparatus is equipped with a detection device for determining a phase difference between the time-code signal demodulated from the left and the right signal, respectively. In this way, the desired direction of play of the digital audio equipment can be determined already when the needle is lowered onto the disc according to the invention without noticeable delay, enhancing the impression that one is working with an entirely conventional analogue audio installation.

A suitable embodiment of the apparatus is characterized in that it comprises a digital audio buffer being under control of the time-code signal, and that the digital audio buffer is connected to a digital output filter which feeds a signal output which is selected from the group formed by a digital electric output socket, a digital optic signal output, and a D/A converter.

The scratch effect can be manufactured in such an apparatus particularly adequately when it comprises control logic being fed by the time-code signal for determining a velocity signal being a measure for the speed of change of the time-code signal, and that the digital output filter is being controlled by the said control logic.

BRIEF DESCRIPTION OF THE DRAWINGS

The invention will now be further elucidated in respect of a non-limiting embodiment explaining the disc and its use in an apparatus according to the invention in a schematic diagram.

DETAILED DESCRIPTION OF A PREFERRED EMBODIMENT

Figure 1:
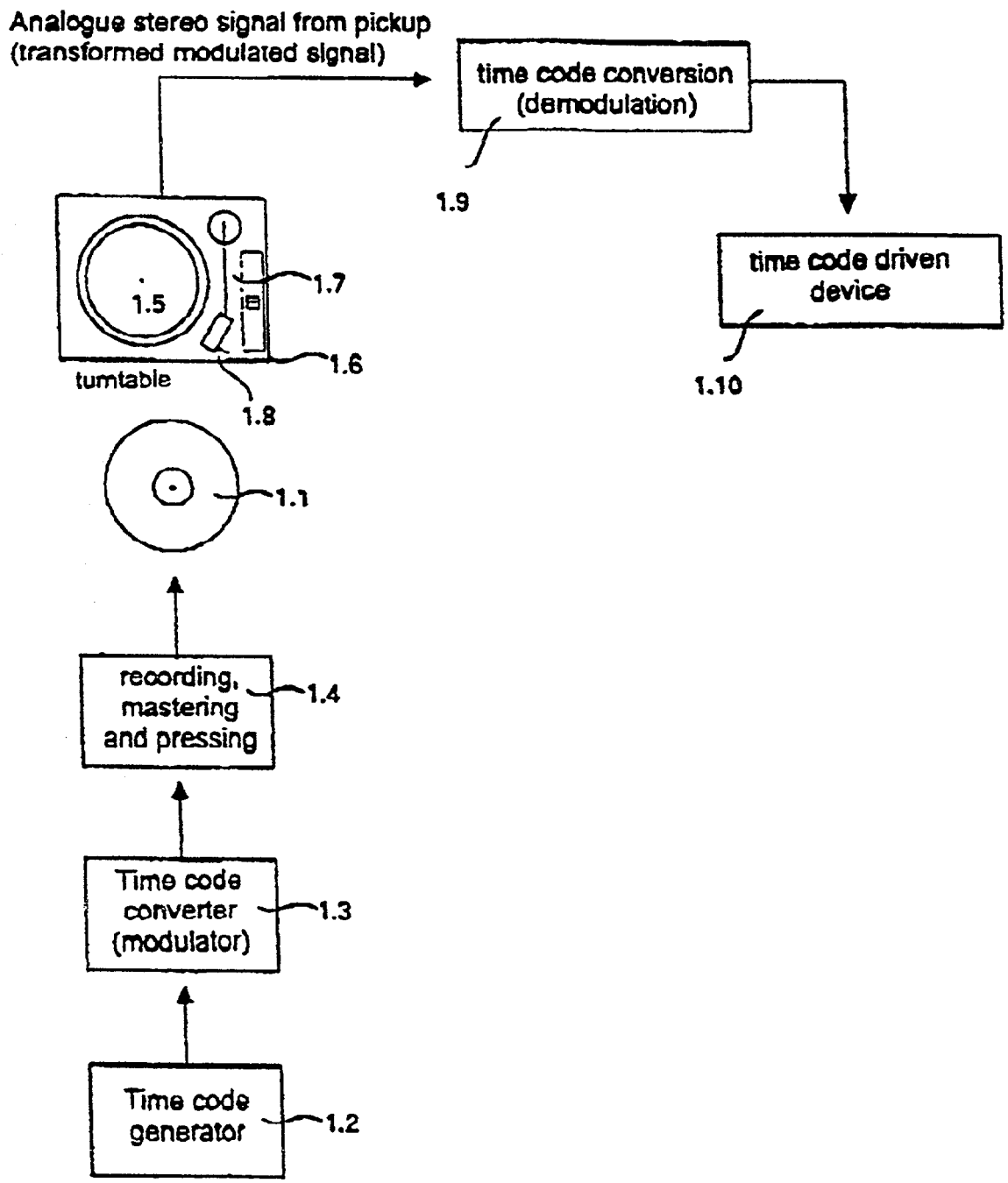
FIG. 1 shows schematically the apparatus for signal processing according to the invention and the disc to be used thereby.

FIG. 1 shows a disc 1.1 which is manufactured according to known manufacturing techniques that have been in use for many years now in the manufacture of conventional records. The disc 1.1 is provided with an absolute time-code signal by making use of a time-code generator 1.2 controlling a modulator 1.3 which supplies a carrier frequency modulated by the time-code generator 1.2 and which is applied to the disc 1.1 as the only signal. Block 1.4 shows the conventional manufacturing method of recording, making of the master disc, and pressing the final vinyl disc 1.1. The disc 1.1 can be placed on a turntable 1.5 of a record player 1.6, which is further provided with an arm 1.7 and a pick-up element 1.8.

The pick-up element 1.8 can follow the groove in the disc 1.1 that comprises the absolute time-code signal, and the pick-up element 1.8 is connected to the apparatus part 1.9 for demodulating the carrier signal in order to provide the (digital) time-code signal, which serves for the control of the digital audio source 1.10, for instance a CD player, a DVD player, an MP3 reproduction device, or the like.

Figure 2:
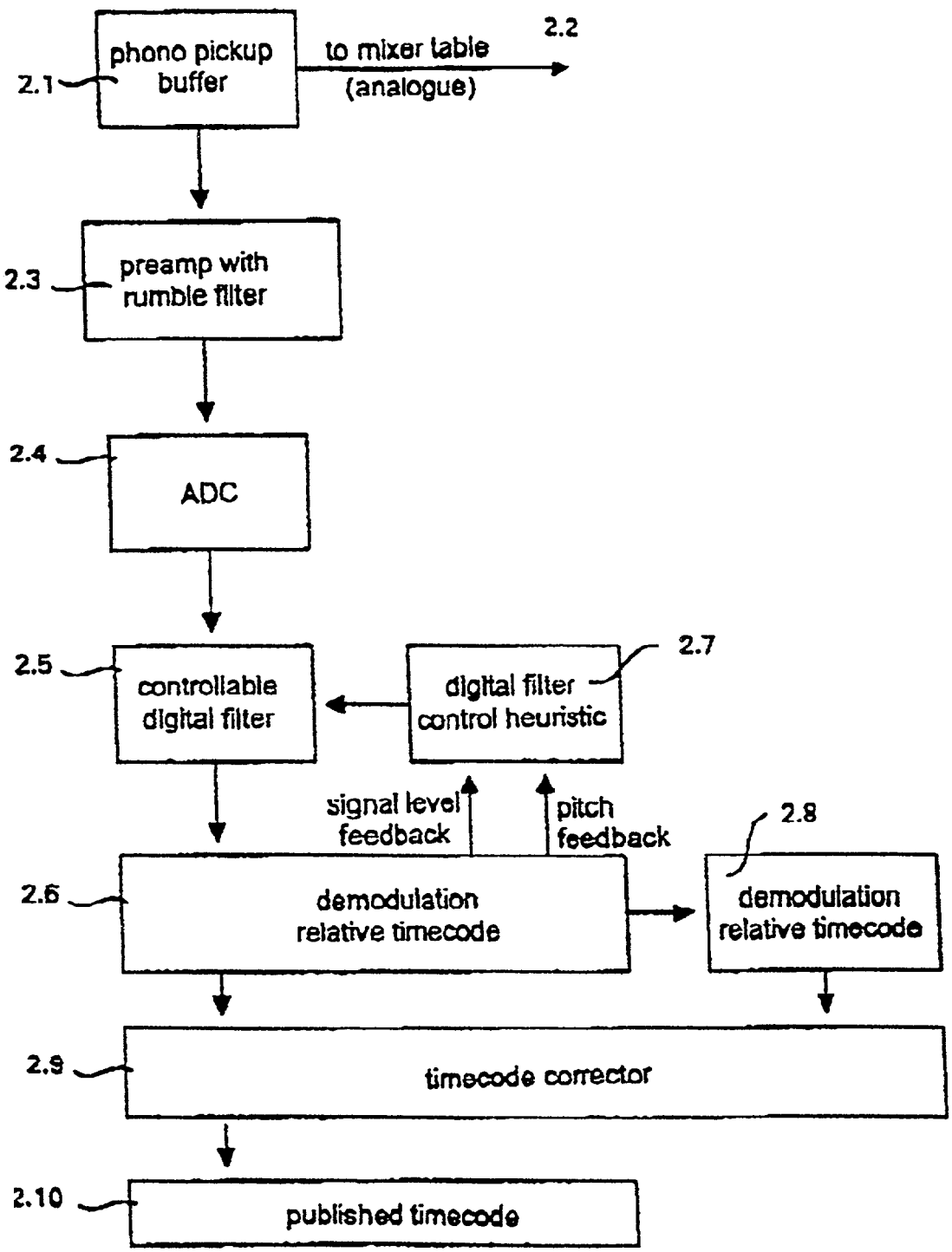
FIGS. 2 and 3 then show as block diagrams the signal processing applied in the apparatus according to the invention.
Figure 3:
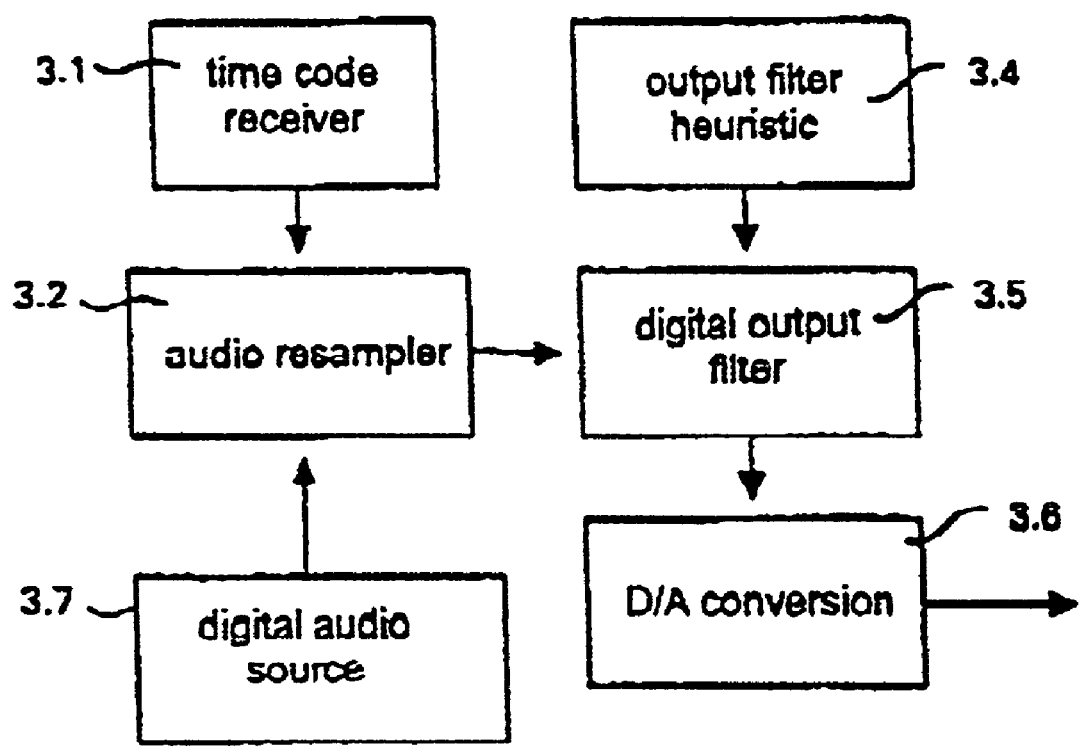

The operation of the apparatus part 1.9 according to FIG. 1 will hereafter be further elucidated with reference to FIG. 2. The operation of the digital audio source 1.10 which stands under control of the time-code signal will hereafter be further elucidated with reference to FIG. 3.

Referring now first to FIG. 2, it is shown that the signal that is derived from the pick-up element 1.8 according to FIG. 1, is fed to a input buffer 2.1 from which a signal may be finally led to a mixing table 2.2 in order to provide for the situation that the turntable 1.5 according to FIG. 1 carries a conventional analogue vinyl record. The just-mentioned input buffer 2.1 feeds a preamplifier 2.3, provided with a low rejector circuit, and which feeds in turn an analogue/digital converter 2.4, for instance a 16-bit or 30-bit converter, depending on the desired resolution. The reference numerals 2.5, 2.6 and 2.7 refer to a digital filter, the operation of which depends on, inter alia, the speed of movement of the disc 1.1 according to FIG. 1 vis-à-vis the pick-up element 1.8. The apparatus part 2.7 of FIG. 2 may comprise a phase-locked loop circuit for detecting and following the carrier frequency which is provided on the disc 1.1 according to FIG. 1. In the current implementation, however, use is made of a moving average filter supplemented with detection means for detecting a stand-still of the disc 1.1. Furthermore, demodulation takes place in the circuit of apparatus part 2.6 for demodulating the time-code signal that is modulated on the carrier frequency. Although the above subject matter is shown and explained as the signal in a single channel, it is preferable according to the invention that a left and a right channel is present, and that the detection apparatus which forms part of the digital filter 2.5, 2.6, 2.7 is made in duplicate so as to allow a phase difference between the left and the right channel carrying the demodulated time-code signal to be determined. In this manner, the correct place and direction of movement of the disc 1.1 in relation to the pick-up element 1.8 according to FIG. 1 can be determined with high resolution. The phase difference between the left and right channel is useful to extract the directional information very quickly when the pick-up element 1.8 is suddenly lowered onto the rotating disc 1.1. The absolute time-code which is determined from the carrier frequency is subsequently used together with the relative time-code, which is based on the difference between the left and the right channel, to determine an accurate time-code signal 2.10 which serves to control the digital audio source 1.10 as shown in FIG. 1. The time-code signal 2.10 of FIG. 2 is therefore read into apparatus part 3.1 (see FIG. 3) of the digital audio source, wherein same provides a direct control of a digital audio reader 3.2 reading the desired digital information from the correct place of for instance a CD disc. This digital audio information is being transferred from apparatus part 3.2 to a digital output filter 3.5 which is being controlled by control logic 3.4, and which determines from the time-code signal which is read into apparatus part 3.1, the speed of change of the time-code signal. This speed of change signal which is derived from the time-code signal, determines the parameters of the digital output filter 3.5. In a manner known to the expert, the digital output filter 3.5 can then feed a digital electric output socket, a digital optical signal output, or a D/A converter. This last provision is shown in the figure with reference numeral 3.6.

What is claimed is:

1. Apparatus for signal processing in conjunction with a digital audio source, said apparatus comprising:
   a record player with a turntable and an arm;
   a pick-up element disposed on said arm for playing a conventional record; and
   a digital filter fed by said pick-up element comprising a circuit for detecting and following a carrier frequency and a demodulation circuit for demodulating a time-code signal that is modulated on the carrier frequency in the audible range between 20 and 20,000 Hz.

2. Apparatus according to claim 1, wherein said apparatus additionally comprises a detection device for determining phase difference between the time-code signal demodulated from left and right channel signals, respectively.

3. Apparatus according to claim 1, wherein the time-code signal controls the digital audio source.

4. Apparatus according to claim 3, wherein said apparatus additionally comprises a digital audio buffer under control of the time-code signal, and wherein the digital audio buffer is connected to a digital output filter which feeds a signal output which is selected from the group consisting of a digital electric output socket, a digital optic signal output, and a digital-to-analog converter.

5. Apparatus according to claim 4, wherein said apparatus additionally comprises a control logic device fed by the time-code signal and determining a velocity signal being a measure for speed of change of the time-code signal, and wherein the digital output filter is controlled by said control logic device.

* * * * *